(12) United States Patent
Kim et al.

(10) Patent No.: US 10,740,593 B1
(45) Date of Patent: Aug. 11, 2020

(54) METHOD FOR RECOGNIZING FACE USING MULTIPLE PATCH COMBINATION BASED ON DEEP NEURAL NETWORK WITH FAULT TOLERANCE AND FLUCTUATION ROBUSTNESS IN EXTREME SITUATION

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

(*) Notice: Subject to any disclaimer, the term of this patent is extended or adjusted under 35 U.S.C. 154(b) by 0 days.

(21) Appl. No.: 16/721,961

(22) Filed: Dec. 20, 2019

Related U.S. Application Data

(60) Provisional application No. 62/799,076, filed on Jan. 31, 2019.

(51) Int. Cl.
*G06K 9/00* (2006.01)
*G06K 9/62* (2006.01)
*G06K 9/46* (2006.01)

(52) U.S. Cl.
CPC ..... *G06K 9/00268* (2013.01); *G06K 9/00228* (2013.01); *G06K 9/4642* (2013.01);
(Continued)

(58) Field of Classification Search
CPC ........... G06K 9/00268; G06K 9/00228; G06K 9/6232; G06K 9/6262; G06K 9/6256; G06K 9/4642
See application file for complete search history.

(56) References Cited

U.S. PATENT DOCUMENTS

| 9,996,768 B2* | 6/2018 | Shen ................ G06K 9/4628 |
| 2008/0260239 A1* | 10/2008 | Han ................ G06K 9/00248 382/156 |

(Continued)

OTHER PUBLICATIONS

Yang et al., Neural Aggregation Network for Video Face Recognition, pp. 1-10, Aug. 2017.*

(Continued)

*Primary Examiner* — John B Strege
(74) *Attorney, Agent, or Firm* — Xsensus LLP (57) ABSTRACT

A method for face recognition by using a multiple patch combination based on a deep neural network is provided. The method includes steps of: a face-recognizing device, (a) if a face image with a 1-st size is acquired, inputting the face image into a feature extraction network, to allow the feature extraction network to generate a feature map by applying convolution operation to the face image with the 1-st size, and to generate multiple features by applying sliding-pooling operation to the feature map, wherein the feature extraction network has been learned to extract a feature using a face image for training having a 2-nd size and wherein the 2-nd size is smaller than the 1-st size; and (b) inputting the multiple features into a learned neural aggregation network, to allow the neural aggregation network to aggregate the multiple features and to output an optimal feature for the face recognition.

16 Claims, 6 Drawing Sheets

(52) U.S. Cl.
CPC ......... *G06K 9/6232* (2013.01); *G06K 9/6256* (2013.01); *G06K 9/6262* (2013.01)

(56) References Cited

U.S. PATENT DOCUMENTS

| | | | | |
|---|---|---|---|---|
| 2016/0048741 A1* | 2/2016 | Nguyen | ............... | G06K 9/6256 |
| | | | | 382/159 |
| 2016/0104058 A1* | 4/2016 | He | ...................... | G06K 9/6255 |
| | | | | 382/156 |
| 2017/0372174 A1* | 12/2017 | Wshah | ................. | G06N 3/0454 |
| 2018/0060698 A1* | 3/2018 | Hua | .................... | G06K 9/6257 |
| 2019/0318171 A1* | 10/2019 | Wang | ................. | G06K 9/00771 |
| 2019/0392248 A1* | 12/2019 | Zhang | ..................... | G06N 3/08 |

OTHER PUBLICATIONS

Yen Li, et al., "Weighted Feature Pooling Network in Template-Based Recognition", ACCV 2018, LNCS 11365, pp. 436-451, 2019, https://link.springer.com/chapter/10.1007%2F978-3-030-20873-8_28.

Bo Yang, et al., "Robust Attentional Aggregation of Deep Feature Sets for Multi-view 3D Reconstruction", arXiv:1808.00758v2, Aug. 18, 2019, pp. 1-19.

Zhipeng Ji, et al., "Deep Age Estimation Model Stabilization from Images to Videos", ICPR, Aug. 20-24, 2018, pp. 1-6.

Shuo Yang, et al., "Face Detection through Scale-Friendly Deep Convolutional Networks", arXiv:1706.02863v1, Jun. 9, 2017, pp. 1-12.

\* cited by examiner

FEATURE MAP

MULTIPLE FEATURES

FIG. 6

METHOD FOR RECOGNIZING FACE USING MULTIPLE PATCH COMBINATION BASED ON DEEP NEURAL NETWORK WITH FAULT TOLERANCE AND FLUCTUATION ROBUSTNESS IN EXTREME SITUATION

CROSS REFERENCE TO RELATED APPLICATION

This application claims the benefit of priority to U.S. Provisional Patent Application Ser. No. 62/799,076, filed on Jan. 31, 2019, the entire contents of which being incorporated herein by reference.

FIELD OF THE DISCLOSURE

The present disclosure relates to a face-recognizing device; and more particularly, to a system for recognizing a face using multiple features corresponding to a face image.

BACKGROUND OF THE DISCLOSURE

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Among the existing DL architectures, convolutional neural network (CNN) is one of the most popular DL architectures. Although the idea behind CNN has been known for more than 20 years, the true power of CNN has only been recognized after the recent development of the deep learning theory. To date, CNN has achieved numerous successes in many artificial intelligence and machine learning applications, such as face recognition, image classification, image caption generation, visual question answering, and automatic driving cars.

Face detection is an important process in many face recognition applications. A large number of face detection techniques can easily detect near frontal faces.

In the face recognition as such, the face is recognized by a feature extraction network, which extracts features from an inputted face image, by using the extracted features.

In particular, conventional face recognition devices use input augmentation to improve facial recognition performance.

Figure 1:
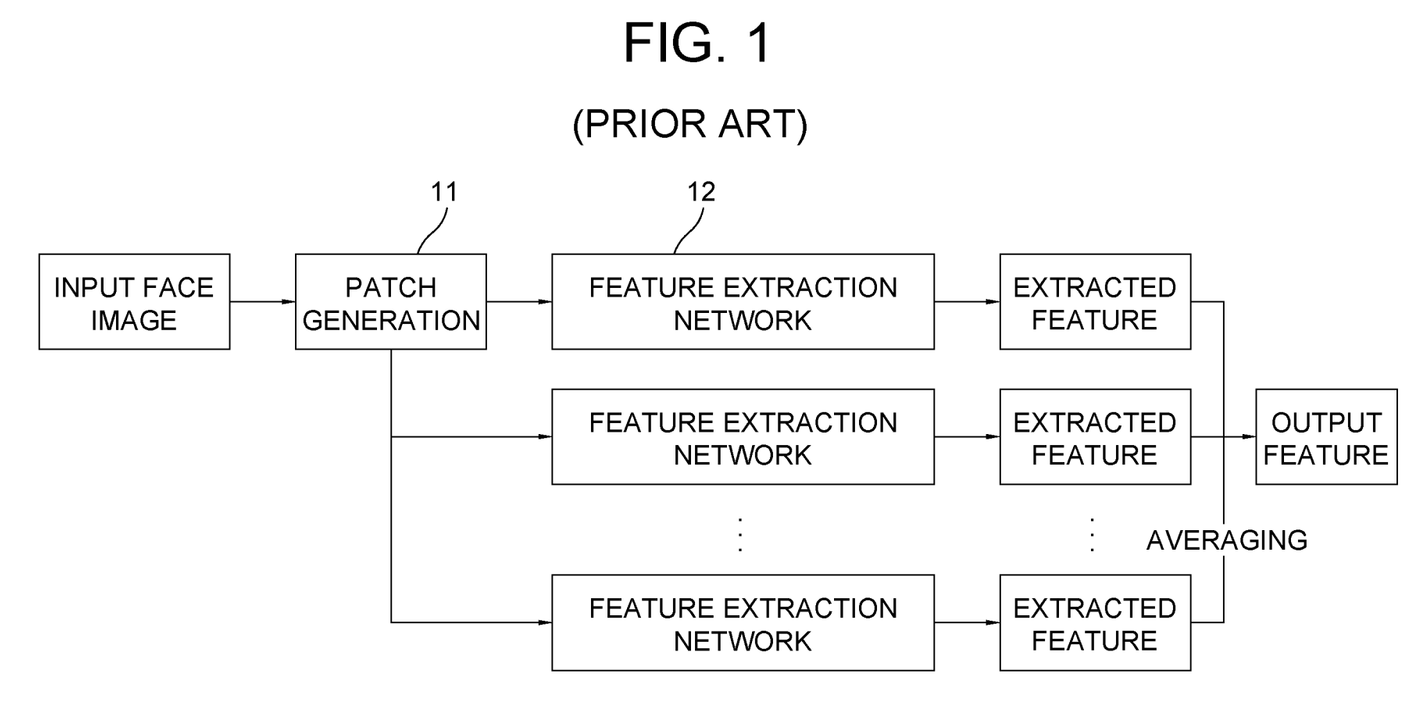
FIG. 1 is a drawing schematically illustrating a conventional face-recognizing device.

That is, by referring to FIG. 1, when the face image is inputted, a patch generation 11 may process the face image by using a method such as translation or flip to generate a plurality of patches corresponding to the face image, and a feature extraction network 12 extracts the features from each of the generated patches, and outputs the features corresponding to the face image by averaging the extracted features to perform the face recognition of the face image.

However, these conventional face-recognizing devices take a long time and consume huge computing resources since forward computing must be performed by the feature extraction network as many times as the number of the generated patches.

In addition, with the conventional face recognition devices, it is difficult to ensure a reliability of face recognition results because there is no guarantee that the averaged features are the most optimal features corresponding to the face image.

SUMMARY OF THE DISCLOSURE

It is an object of the present disclosure to solve all the aforementioned problems.

It is another object of the present disclosure to acquire multiple features without a patch generation.

It is still another object of the present disclosure to acquire the multiple features by using a single forward computing without the patch generation.

It is still yet another object of the present disclosure to minimize time required for a face recognition and minimize use of computing resources.

It is still yet another object of the present disclosure to ensure a reliability of a face recognition result.

In accordance with one aspect of the present disclosure, there is provided a method for face recognition by using a multiple patch combination based on a deep neural network, including steps of: (a) if a face image with a 1-st size is acquired, a face-recognizing device performing a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size; and (b) the face-recognizing device performing a process of inputting the multiple features into a learned neural aggregation network, to thereby allow the neural aggregation network to aggregate the multiple features and thus to output at least one optimal feature for the face recognition.

As one example, at the step of (a), the face-recognizing device performs a process of inputting the face image with the 1-st size into at least one convolutional layer of the feature extraction network, to thereby allow the at least one convolutional layer to generate the feature map with a (1_1)-st size by applying at least one convolution operation to the face image with the 1-st size, a process of inputting the feature map with the (1_1)-st size into a pooling layer, to thereby allow the pooling layer to generate the multiple features with a (2_1)-st size by applying sliding-pooling operation to the feature map with the (1_1)-st size, wherein the (2_1)-st size is a size of a feature map for training, corresponding to a face image for training with the 2-nd size, generated by the feature extraction network.

As one example, the feature extraction network has been learned by a 1-st learning device repeating more than once (i) a process of inputting the face image for training with the 2-nd size into the at least one convolutional layer, to thereby allow the at least one convolutional layer to apply at least one convolution operation using at least one previously learned convolution parameter of the at least one convolutional layer to the face image for training with the 2-nd size and thus to generate the feature map for training with the (2_1)-st size, and (ii) a process of updating the at least one previously learned convolution parameter of the at least one convolutional layer by referring to characteristic information for training and its corresponding ground truth wherein the characteristic information for training corresponds to the feature map for training with the (2_1)-st size, such that one or more 1-st losses are minimized which are created by a 1-st loss layer.

As one example, the face-recognizing device instructs the pooling layer to apply sliding-pooling operation to the feature map with the (1_1)-st size using a preset stride.

As one example, at the step of (b), the face-recognizing device performs a process of inputting the multiple features into at least two attention blocks of the neural aggregation network, to thereby allow the at least two attention blocks to aggregate the multiple features and thus to output the optimal feature.

As one example, the face-recognizing device performs a process of allowing the at least two attention blocks to aggregate the multiple features and thus to generate each of quality scores corresponding to each of the multiple features, and a process of outputting the optimal feature by weighted summation of the multiple features using the quality scores.

As one example, the neural aggregation network has been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are created by a 2-nd loss layer referring to the optimal feature for training and its corresponding ground truth.

As one example, the method further includes a step of: (c) the face-recognizing device performing a process of retrieving a reference feature from a face information database by referring to the optimal feature, to thereby recognize a face on the face image.

In accordance with another aspect of the present disclosure, there is provided a method for face-recognizing device for face recognition by using a multiple patch combination based on a deep neural network, including: at least one memory that stores instructions; and at least one processor configured to execute the instructions to perform or support another device to perform: (I) if a face image with a 1-st size is acquired, a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size and (II) a process of inputting the multiple features into a learned neural aggregation network, to thereby allow the neural aggregation network to aggregate the multiple features and thus to output at least one optimal feature for the face recognition.

As one example, at the process of (I), the processor performs a process of inputting the face image with the 1-st size into at least one convolutional layer of the feature extraction network, to thereby allow the at least one convolutional layer to generate the feature map with a (1_1)-st size by applying at least one convolution operation to the face image with the 1-st size, a process of inputting the feature map with the (1_1)-st size into a pooling layer, to thereby allow the pooling layer to generate the multiple features with a (2_1)-st size by applying sliding-pooling operation to the feature map with the (1_1)-st size, wherein the (2_1)-st size is a size of a feature map for training, corresponding to a face image for training with the 2-nd size, generated by the feature extraction network.

As one example, the feature extraction network has been learned by a 1-st learning device repeating more than once (i) a process of inputting the face image for training with the 2-nd size into the at least one convolutional layer, to thereby allow the at least one convolutional layer to apply at least one convolution operation using at least one previously learned convolution parameter of the at least one convolutional layer to the face image for training with the 2-nd size and thus to generate the feature map for training with the (2_1)-st size, and (ii) a process of updating the at least one previously learned convolution parameter of the at least one convolutional layer by referring to characteristic information for training and its corresponding ground truth wherein the characteristic information for training corresponds to the feature map for training with the (2_1)-st size, such that one or more 1-st losses are minimized which are created by a 1-st loss layer.

As one example, the processor instructs the pooling layer to apply sliding-pooling operation to the feature map with the (1_1)-st size using a preset stride.

As one example, at the process of (II), the processor performs a process of inputting the multiple features into at least two attention blocks of the neural aggregation network, to thereby allow the at least two attention blocks to aggregate the multiple features and thus to output the optimal feature.

As one example, the processor performs a process of allowing the at least two attention blocks to aggregate the multiple features and thus to generate each of quality scores corresponding to each of the multiple features, and a process of outputting the optimal feature by weighted summation of the multiple features using the quality scores.

As one example, the neural aggregation network has been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are created by a 2-nd loss layer referring to the optimal feature for training and its corresponding ground truth.

As one example, the processor further performs: (III) a process of retrieving a reference feature from a face information database by referring to the optimal feature, to thereby recognize a face on the face image.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

Figure 2:
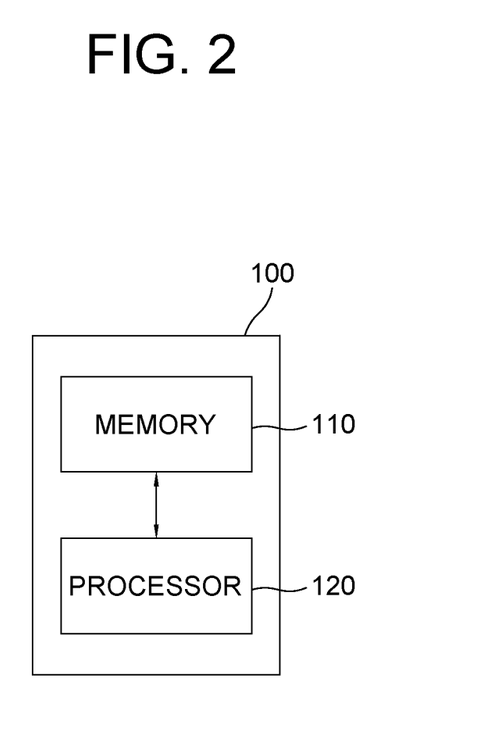
FIG. 2 is a drawing schematically illustrating a face-recognizing device for performing a face recognition by using a multiple patch combination based on a neural network in accordance with one example embodiment of the present disclosure.

FIG. 2 is a drawing schematically illustrating a face-recognizing device for performing a face recognition by using a multiple patch combination based on a neural network in accordance with one example embodiment of the present disclosure. By referring to FIG. 2, the face-recognizing device 100 may include a memory 110 for storing instructions to perform the face recognition of at least one face image by using the multiple patch combination based on the neural network, and a processor 120 for performing processes corresponding to the instructions in the memory 110 to perform the face recognition of the face image by using the multiple patch combination based on the neural network. Herein, the neural network may include a deep learning network or a deep neural network, but the scope of the present disclosure is not limited thereto.

Specifically, the face-recognizing device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 3:
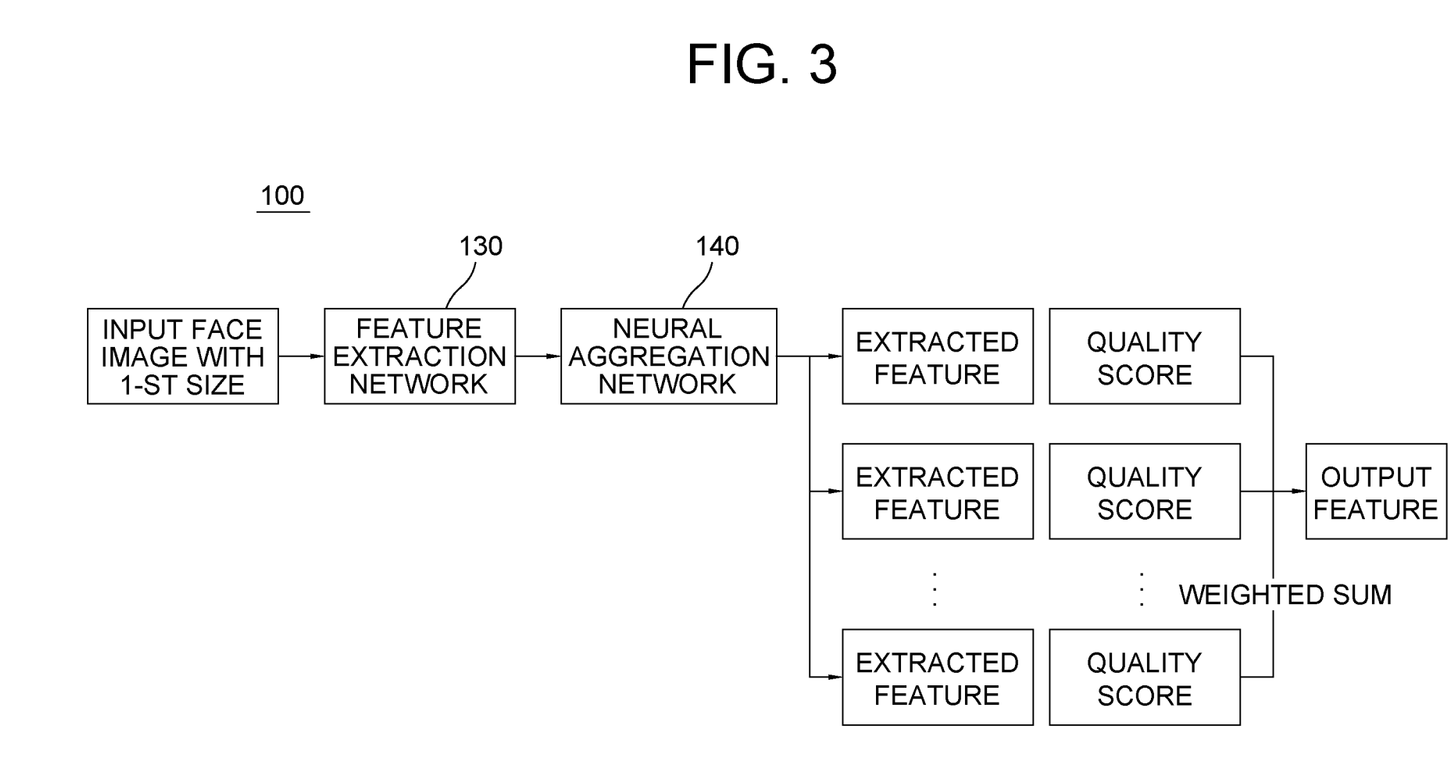
FIG. 3 is a drawing schematically illustrating a method for performing the face recognition by using the multiple patch combination based on the neural network in accordance with one example embodiment of the present disclosure.

A method for performing the face recognition of the face image by using the multiple patch combination based on the neural network by using the face-recognizing device 100 in accordance with one example embodiment of the present disclosure is described by referring to FIG. 3 as follows.

First, if a face image with a 1-st size is acquired, the face-recognizing device 100 may perform a process of inputting the face image into a feature extraction network 130, to thereby allow the feature extraction network 130 to generate a feature map by applying at least one convolution operation to the face image with the 1-st size, and thus to generate multiple features by applying sliding-pooling operation to the feature map, where the feature extraction network 130 has been learned to extract at least one feature using a face image for training with a 2-nd size. Herein, the 2-nd size is smaller than the 1-st size.

Figure 4:
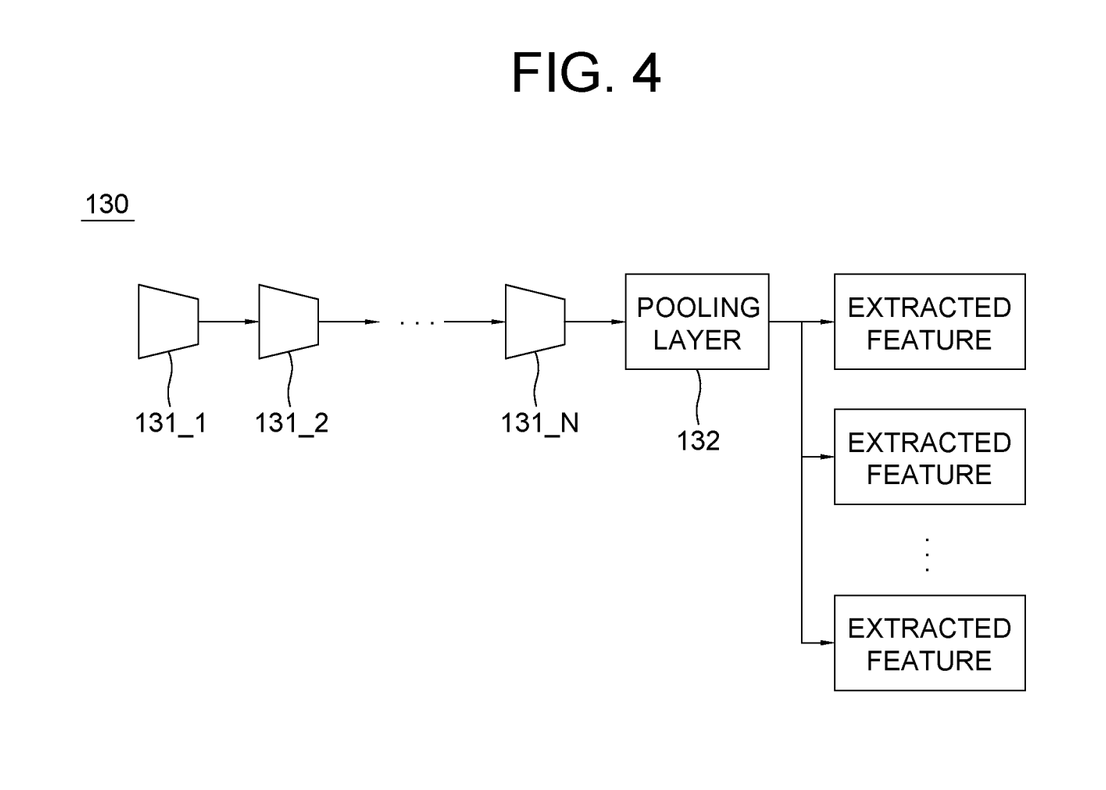
FIG. 4 is a drawing schematically illustrating a feature extraction network in the method for performing the face recognition by using the multiple patch combination based on the neural network in accordance with one example embodiment of the present disclosure.

As one example, by referring to FIG. 4, if the face image with the 1-st size is acquired, the feature extraction network 130 may perform a process of generating the feature map with a (1_1)-st size by applying multiple convolution operations to the face image with the 1-st size, using a 1-st convolutional layer 131_1 to an n-th convolutional layer 131_n. Herein, the 1-st convolutional layer 131_1 to the n-th convolutional layer 131_n may have been learned to apply multiple convolution operations to the face image for training with the 1-st size, to thereby generate the feature map for training with a (2_1)-st size. Herein, the (2_1)-st size may be smaller than the (1_1)-st size.

Figure 5:
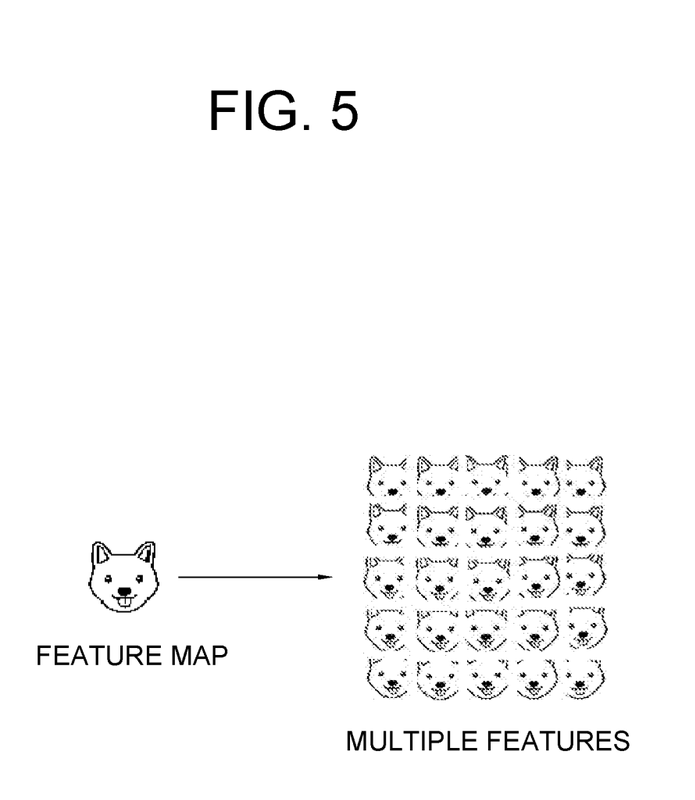
FIG. 5 is a drawing schematically illustrating exemplar multiple patches generated in the method for performing the face recognition by using the multiple patch combination based on the neural network in accordance with one example embodiment of the present disclosure.

And, by referring to FIG. 5, the feature extraction network 130 may allow a pooling layer 132 to generate the multiple features with the (2_1)-st size by applying the sliding-pooling operation to the feature map with the (1_1)-st size, using a pooling size of the (2_1)-st size. Herein, the sliding-pooling operation may be performed using a preset stride. Also, FIG. 5 does not represent an actual feature map, but shows the face images corresponding to the feature map, for convenience of explanation.

This process is described in detail as follows.

A learning device may have completed a process of instructing the feature extraction network 130 to apply multiple convolution operations to a face image for training with a size of 192×192, to thereby generate a feature map with a size of 6×6, and a process of instructing the pooling layer to apply one or more 6×6 pooling operations to the feature map with the size of 6×6, to thereby output a feature vector.

Herein, if each of the convolutional layers 131_1 to 131_n of the feature extraction network is configured as each layer capable of applying convolution operation to its corresponding input image or its corresponding input feature map to output each feature map with half a size of its corresponding input image or its corresponding input feature map, then the face image for training with the size of 192×192 may be converted into the feature map with the size of 6×6 by six convolution operations.

And, if a face image with a size of 320×320 is inputted into the feature extraction network 130 learned as such, then the feature extraction network 130 may perform six convolution operations, to thereby output a feature map with a size of 10×10, by a process similar to the learning process.

Then, the feature extraction network 130 may instruct the pooling layer 132 to apply 6×6 pooling operations to the feature map with the size of 10×10 by using a sliding window, to thereby generate 25 multiple features of at least one region corresponding to the size of 6×6. That is, the pooling layer may move a window with the size of 6×6 by one stride, and may apply the pooling operation to the feature map with the size of 10×10, to thereby generate the 25 multiple features. Herein, the pooling layer 132 may output the feature vector which is generated by vectorizing the multiple features.

As a result, the multiple features of a single face image may be generated by a single forward computing process in accordance with the present disclosure, unlike conventional methods.

Meanwhile, the feature extraction network 130 may have been learned by a 1-st learning device repeating more than once (i) a process of inputting the face image for training with the 2-nd size into the at least one convolutional layer, to thereby allow the at least one convolutional layer to apply at least one convolution operation using at least one previously learned convolution parameter of the at least one convolutional layer to the face image for training with the 2-nd size and thus to generate the feature map for training with the (2_1)-st size, and (ii) a process of updating the at least one previously learned convolution parameter of the at least one convolutional layer by referring to characteristic information for training and its corresponding ground truth wherein the characteristic information for training corresponds to the feature map for training with the (2_1)-st size, such that one or more 1-st losses are minimized which are created by a 1-st loss layer.

That is, the at least one convolutional layer may have been learned to output accurate face features corresponding to the inputted face image through repeating a process of updating the at least one previously learned convolution parameter of the at least one convolutional layer by backpropagation referring to at least one of (i) a difference between (i-1) a feature for training with the (2_1)-st size by the pooling layer applying pooling operation to the feature map for training with the (2_1)-st size and (i-2) a preset feature of the face image for training, and (ii) a difference between (ii-1) face information recognized by using the feature for training and (ii-2) preset face information corresponding to the face image for training.

Next, the face-recognizing device 100 may input the acquired multiple features into a neural aggregation network 140, and may instruct the neural aggregation network 140 to generate at least one optimal feature, to be used for the face recognition, by aggregation of the multiple features.

Figure 6:
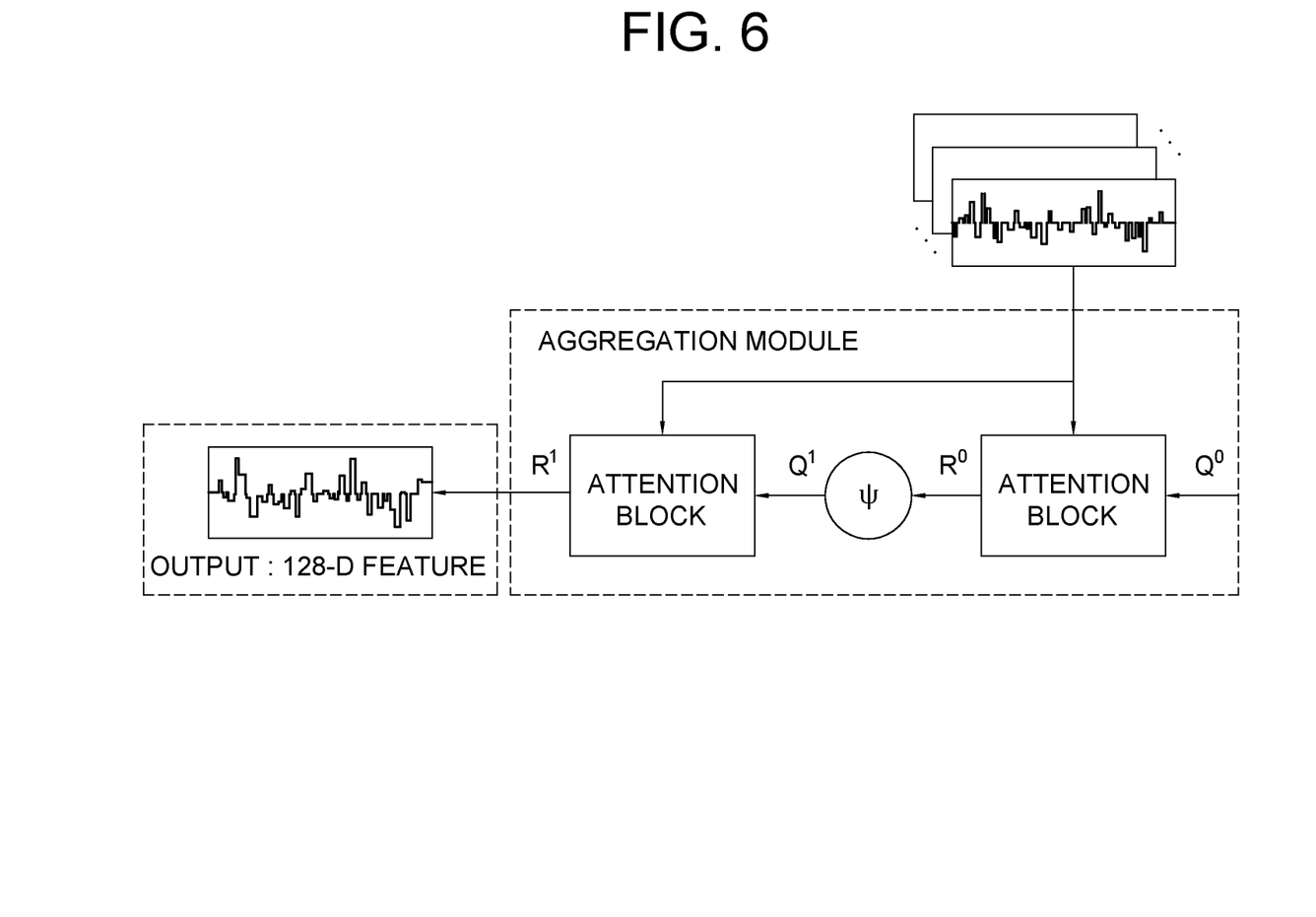
FIG. 6 is a drawing schematically illustrating a neural aggregation network in the method for performing the face recognition by using the multiple patch combination based on the neural network in accordance with one example embodiment of the present disclosure.

As one example, by referring to FIG. 6, the face-recognizing device 100 may perform a process of inputting the multiple features into at least two attention blocks of the neural aggregation network 140, to thereby allow the at least two attention blocks to aggregate the multiple features and thus to output the optimal feature.

That is, the face-recognizing device 100 may perform a process of allowing the at least two attention blocks of the neural aggregation network 140 to aggregate the multiple features and thus to generate each of quality scores corresponding to each of the multiple features, and a process of outputting the optimal feature by weighted summation of the multiple features using the quality scores.

Herein, the neural aggregation network 140 may only use an aggregation module, in a neural aggregation network for performing the face recognition in a video. Also, the quality scores may be values learned such that the neural aggregation network 140 shows maximum performance in the face recognition.

Meanwhile, the neural aggregation network for performing the face recognition in a video is disclosed in "Neural Aggregation Network for Video Face Recognition" published at 2017 IEEE Conference on Computer Vision and Pattern Recognition (CVPR).

Meanwhile, the neural aggregation network 140 may have been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are outputted from a 2-nd loss layer by referring to the optimal feature for training and its corresponding ground truth.

Next, the face-recognizing device 100 may use the optimal feature to be used for the face recognition created by weighted summation of the multiple features using the quality scores, to thereby recognize a face on the face image by retrieving at least one reference feature from a face information database by referring to the optimal feature.

That is, the present disclosure acquires multiple translated features only with the single forwarding without the patch generation, and maximizes performance in the face recognition by acquiring weighted summed features, among the multiple translated features, which put a higher weight on a feature that plays an important role in the face recognition by using the neural aggregation network.

In accordance with the present disclosure, the feature extractor network may generate efficient multiple-view features using larger images than images with which the learning process is performed, and the neural aggregation network may output the optimal feature. As a result, mobile devices, surveillance, drones may utilize the face recognition that is fluctuation robust and pose invariant.

The present disclosure has an effect of acquiring the multiple features of the input image larger than a learned image without the patch generation.

The present disclosure has another effect of reducing time and computing resources required for a feature extraction by acquiring the multiple features of the input image larger than the learned image with the single forward computing during the feature extraction.

The present disclosure has still another effect of ensuring a reliability of the face recognition result by outputting the optimal feature resulting from the weighted sum of the multiple features using the quality scores.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for face recognition by using a multiple patch combination based on a deep neural network, comprising:
(a) if a face image with a 1-st size is acquired, a face-recognizing device performing a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size; and
(b) the face-recognizing device performing a process of inputting the multiple features into a learned neural aggregation network, to thereby allow the neural aggregation network to aggregate the multiple features and thus to output at least one optimal feature for the face recognition,
wherein, at (a), the face-recognizing device performs a process of inputting the face image with the 1-st size into at least one convolutional layer of the feature extraction network, to thereby allow the at least one convolutional layer to generate the feature map with a (1_1)-st size by applying at least one convolution operation to the face image with the 1-st size, a process of inputting the feature map with the (1_1)-st size into a pooling layer, to thereby allow the pooling layer to generate the multiple features with a (2_1)-st size by applying sliding-pooling operation to the feature map with the (1_1)-st size, wherein the (2_1)-st size is a size of a feature map for training, corresponding to a face image for training with the 2-nd size, generated by the feature extraction network,
wherein, the feature extraction network has been learned by a 1-st learning device repeating more than once (i) a process of inputting the face image for training with the 2-nd size into the at least one convolutional layer, to thereby allow the at least one convolutional layer to apply at least one convolution operation using at least one previously learned convolution parameter of the at least one convolutional layer to the face image for training with the 2-nd size and thus to generate the feature map for training with the (2_1)-st size, and (ii) a process of updating the at least one previously learned convolution parameter of the at least one convolutional

11 layer by referring to characteristic information for training and its corresponding ground truth wherein the characteristic information for training corresponds to the feature map for training with the (2_1)-st size, such that one or more 1-st losses are minimized which are created by a 1-st loss layer.

2. The method of claim 1, wherein the face-recognizing device instructs the pooling layer to apply sliding-pooling operation to the feature map with the (1_1)-st size using a preset stride.

3. The method of claim 1, wherein, at (b), the face-recognizing device performs a process of inputting the multiple features into at least two attention blocks of the neural aggregation network, to thereby allow the at least two attention blocks to aggregate the multiple features and thus to output the optimal feature.

4. The method of claim 3, wherein the face-recognizing device performs a process of allowing the at least two attention blocks to aggregate the multiple features and thus to generate each of quality scores corresponding to each of the multiple features, and a process of outputting the optimal feature by weighted summation of the multiple features using the quality scores.

5. The method of claim 3, wherein the neural aggregation network has been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are created by a 2-nd loss layer referring to the optimal feature for training and its corresponding ground truth.

6. The method of claim 1, further comprising:
   (c) the face-recognizing device performing a process of retrieving a reference feature from a face information database by referring to the optimal feature, to thereby recognize a face on the face image.

7. A face-recognizing device for face recognition by using a multiple patch combination based on a deep neural network, comprising:
   at least one memory that stores instructions; and
   at least one processor configured to execute the instructions to perform or support another device to perform:
   (I) if a face image with a 1-st size is acquired, a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size and (II) a process of inputting the multiple features into a learned neural aggregation network, to thereby allow the neural aggregation network to aggregate the multiple features and thus to output at least one optimal feature for the face recognition, wherein, at the process of (I), the processor performs a process of inputting the face image with the 1-st size into at least one convolutional layer of the feature extraction network, to thereby allow the at least one convolutional layer to generate the feature map with a (1_1)-st size by applying at least one convolution operation to the face image with the 1-st size, a process of inputting the feature map with the (1_1)-st size into a pooling layer, to thereby allow the pooling layer to generate the multiple features with a (2_1)-st size by applying sliding-pooling operation to the feature map with the (1_1)-st size, wherein the (2_1)-st size is a size of a feature map for training, corresponding to a face image for training with the 2-nd size, generated by the feature extraction network, wherein, the feature extraction network has been learned by a 1-st learning device repeating more than once (i) a process of inputting the face image for training with the 2-nd size into the at least one convolutional layer, to thereby allow the at least one convolutional layer to apply at least one convolution operation using at least one previously learned convolution parameter of the at least one convolutional layer to the face image for training with the 2-nd size and thus to generate the feature map for training with the (2_1)-st size, and (ii) a process of updating the at least one previously learned convolution parameter of the at least one convolutional layer by referring to characteristic information for training and its corresponding ground truth wherein the characteristic information for training corresponds to the feature map for training with the (2_1)-st size, such that one or more 1-st losses are minimized which are created by a 1-st loss layer.

8. The face-recognizing device of claim 7, wherein the processor instructs the pooling layer to apply sliding-pooling operation to the feature map with the (1_1)-st size using a preset stride.

9. The face-recognizing device of claim 7, wherein, at the process of (II), the processor performs a process of inputting the multiple features into at least two attention blocks of the neural aggregation network, to thereby allow the at least two attention blocks to aggregate the multiple features and thus to output the optimal feature.

10. The face-recognizing device of claim 9, wherein the processor performs a process of allowing the at least two attention blocks to aggregate the multiple features and thus to generate each of quality scores corresponding to each of the multiple features, and a process of outputting the optimal feature by weighted summation of the multiple features using the quality scores.

11. The face-recognizing device of claim 9, wherein the neural aggregation network has been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are created by a 2-nd loss layer referring to the optimal feature for training and its corresponding ground truth.

12. The face-recognizing device of claim 7, wherein the processor further performs:
(III) a process of retrieving a reference feature from a face information database by referring to the optimal feature, to thereby recognize a face on the face image.

13. A method for face recognition by using a multiple patch combination based on a deep neural network, comprising:
(a) if a face image with a 1-st size is acquired, a face-recognizing device performing a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size; and
(b) the face-recognizing device performing a process of inputting the multiple features into a learned neural aggregation network, to thereby allow the neural aggregation network to aggregate the multiple features and thus to output at least one optimal feature for the face recognition,
wherein, at (a), the face-recognizing device performs a process of inputting the face image with the 1-st size into at least one convolutional layer of the feature extraction network, to thereby allow the at least one convolutional layer to generate the feature map with a (1_1)-st size by applying at least one convolution operation to the face image with the 1-st size, a process of inputting the feature map with the (1_1)-st size into a pooling layer, to thereby allow the pooling layer to generate the multiple features with a (2_1)-st size by applying sliding-pooling operation to the feature map with the (1_1)-st size, wherein the (2_1)-st size is a size of a feature map for training, corresponding to a face image for training with the 2-nd size, generated by the feature extraction network,
wherein the face-recognizing device instructs the pooling layer to apply sliding-pooling operation to the feature map with (1_1)-st size using a preset stride.

14. A method for face recognition by using a multiple patch combination based on a deep neural network, comprising:
(a) if a face image with a 1-st size is acquired, a face-recognizing device performing a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size; and
(b) the face-recognizing device performing a process of inputting the multiple features into a learned neural aggregation network, to thereby allow the neural aggregation network to aggregate the multiple features and thus to output at least one optimal feature for the face recognition,
wherein, at (b), the face-recognizing device performs a process of inputting the multiple features into at least two attention blocks of the neural aggregation network, to thereby allow the at least two attention blocks to aggregate the multiple features and thus to output the optimal feature,
wherein the neural aggregation network has been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are created by a 2-nd loss layer referring to the optimal feature for training and its corresponding ground truth.

15. A face-recognizing device for face recognition by using a multiple patch combination based on a deep neural network, comprising:
at least one memory that stores instructions; and
at least one processor configured to execute the instructions to perform or support another device to perform: (I) if a face image with a 1-st size is acquired, a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size and (II) a process of inputting the multiple features into a learned neural aggregation network, to thereby allow the neural aggregation network to aggregate the multiple features and thus to output at least one optimal feature for the face recognition,
wherein, at the process of (I), the processor performs a process of inputting the face image with the 1-st size into at least one convolutional layer of the feature extraction network, to thereby allow the at least one convolutional layer to generate the feature map with a (1_1)-st size by applying at least one convolution operation to the face image with the 1-st size, a process of inputting the feature map with the (1_1)-st size into a pooling layer, to thereby allow the pooling layer to generate the multiple features with a (2_1)-st size by applying sliding-pooling operation to the feature map with the (1_1)-st size, wherein the (2_1)-st size is a size of a feature map for training, corresponding to a face image for training with the 2-nd size, generated by the feature extraction network, wherein the processor instructs the pooling layer to apply sliding-pooling operation to the feature map with the (1_1)-st size using a preset stride.

16. A face-recognizing device for face recognition by using a multiple patch combination based on a deep neural network, comprising:
    at least one memory that stores instructions; and
    at least one processor configured to execute the instructions to perform or support another device to perform: (I) if a face image with a 1-st size is acquired, a process of inputting the face image into a feature extraction network, to thereby allow the feature extraction network to generate a feature map by applying at least one convolution operation to the face image with the 1-st size, and thus to generate multiple features by applying sliding-pooling operation to the feature map, wherein the feature extraction network has been learned to extract at least one feature using a face image for training having a 2-nd size and wherein the 2-nd size is smaller than the 1-st size and (II) a process of inputting the multiple features into a learned neural aggregation network, to thereby allow the neural aggregation network to aggregate the multiple features and thus to output at least one optimal feature for the face recognition,
    wherein, at the process of (II), the processor performs a process of inputting the multiple features into at least two attention blocks of the neural aggregation network, to thereby allow the at least two attention blocks to aggregate the multiple features and thus to output the optimal feature,
    wherein the neural aggregation network has been learned by a 2-nd learning device repeating more than once (i) a process of inputting multiple face features for training corresponding to an image set of a single face or a video of the single face into the at least two attention blocks, to thereby allow the at least two attention blocks to generate each of quality scores for training corresponding to each of the face features for training by aggregation of the face features for training using previously learned attention parameters of the at least two attention blocks, (ii) a process of outputting at least one optimal feature for training by weighted summation of the face features for training using the quality scores for training, and (iii) a process of updating the previously learned attention parameters of the at least two attention blocks such that one or more 2-nd losses are minimized which are created by a 2-nd loss layer referring to the optimal feature for training and its corresponding ground truth.

* * * * *